US012759718B2

(12) United States Patent
Miller et al.

(10) Patent No.: US 12,759,718 B2
(45) Date of Patent: Oct. 13, 2026

(54) AIRCRAFT ENGINE TAKEOFF AND CLIMB THRUST CONTROL

(71) Applicant: General Electric Company, Evendale, OH (US)

(72) Inventors: Brandon W. Miller, Middletown, OH (US); Jeffrey D. Clements, Mason, OH (US); Jeffrey D. Rambo, Mason, OH (US); Brian K. Kestner, Cincinnati, OH (US); Matthew Wyborski, Cincinnati, OH (US); Daniel A. Niergarth, Norwood, OH (US); Arthur W. Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/094,561

(22) Filed: Mar. 28, 2025

(65) Prior Publication Data

US 2026/0296659 A1 Oct. 1, 2026

(51) Int. Cl.

*B64D 31/06* (2024.01)
*B64D 27/12* (2006.01)

(Continued)

(52) U.S. Cl.

CPC ............. *B64D 31/06* (2013.01); *B64D 27/12* (2013.01); *G05D 1/652* (2024.01)

(58) Field of Classification Search

CPC ......... B64D 31/06; B64D 27/12; G05D 1/652
See application file for complete search history.

(56) References Cited

U.S. PATENT DOCUMENTS 2,406,506 A 8/1946 Northrop
3,292,880 A 12/1966 Kutney (Continued)

FOREIGN PATENT DOCUMENTS

CN 107839893 3/2018
FR 3127024 3/2023

(Continued)

OTHER PUBLICATIONS

Hardee, Howard; "Cessna SkyCourier cleared by Transport Canada for potential 'remote' operations"; < https://www.flightglobal.com/airframers/cessna-skycourier-cleared-by-transport-canada-for-potential-remote-operations/161157.article>; Dec. 17, 2024; pp. 1-4.

(Continued)

*Primary Examiner* — Mussa A Shaawat
(74) *Attorney, Agent, or Firm* — Fitch, Even, Tabin & Flannery LLP

(57) ABSTRACT

Engines of an aircraft are controlled during a mission including a takeoff phase, a climb phase, and a cruise phase, the climb phase including a top of climb (ToC) period prior to transitioning to the cruise phase. A controller may control the one or more engines to output a takeoff thrust during the takeoff phase, the takeoff thrust corresponding to the maximum thrust during the takeoff phase. The controller may further control the one or more engines to output a ToC thrust during the ToC period, the ToC thrust corresponding to the average thrust during the ToC period, wherein the one or more engines is controlled such that a thrust ratio is between 1.1 to 1.6, the thrust ratio being defined as a ratio of the ToC thrust as normalized by a ToC ambient static pressure to the takeoff thrust as normalized by a takeoff ambient static pressure.

21 Claims, 5 Drawing Sheets

(51) Int. Cl.
*G05D 1/654* (2024.01)
*G05D 1/652* (2024.01)

(56) References Cited

U.S. PATENT DOCUMENTS

| | | | | |
|---|---|---|---|---|
| 5,813,628 | A | 9/1998 | Hahl | |
| 6,851,650 | B2 | 2/2005 | Sankrithi | |
| 6,923,403 | B1 | 8/2005 | Dizdarevic | |
| 9,043,051 | B1 * | 5/2015 | Barber | G08G 5/21 701/3 |
| 10,556,666 | B2 | 2/2020 | Sclafani | |
| 10,773,786 | B2 | 9/2020 | Sclafani | |
| 10,933,970 | B2 | 3/2021 | Harrison | |
| 10,974,808 | B2 | 4/2021 | Harrison | |
| 11,428,170 | B2 * | 8/2022 | Lents | B64D 27/10 |
| 11,518,505 | B1 * | 12/2022 | Bruell | B64C 3/38 |
| 11,619,192 | B2 | 4/2023 | Kirkbride | |
| 11,772,771 | B2 | 10/2023 | Lazzara | |
| 11,787,524 | B2 | 10/2023 | Grip | |
| 12,162,616 | B2 * | 12/2024 | Hedrick | C09D 5/24 |
| 12,269,596 | B1 * | 4/2025 | Savian | B64D 11/02 |
| 2009/0132106 | A1 * | 5/2009 | DeJonge | G05D 1/0661 701/15 |
| 2009/0132107 | A1 * | 5/2009 | DeJonge | G05D 1/0661 701/15 |
| 2011/0056183 | A1 * | 3/2011 | Sankrithi | B64C 11/48 60/226.1 |
| 2011/0208400 | A1 * | 8/2011 | Lickfold | B64D 27/10 701/100 |
| 2015/0275758 | A1 * | 10/2015 | Foutch | F02C 7/047 60/785 |
| 2017/0175678 | A1 | 6/2017 | Sabnis | |
| 2019/0031358 | A1 * | 1/2019 | Sobanski | F02C 9/00 |
| 2019/0121369 | A1 * | 4/2019 | DiRusso | B64D 31/06 |
| 2019/0161209 | A1 * | 5/2019 | Casado-Montero | B64F 1/227 |
| 2020/0025109 | A1 * | 1/2020 | Stieger | F02C 9/20 |
| 2020/0088108 | A1 * | 3/2020 | Klein | F02K 3/06 |
| 2020/0385133 | A1 * | 12/2020 | Ruhan | F02C 9/32 |
| 2021/0025339 | A1 * | 1/2021 | Terwilliger | F02K 5/00 |
| 2021/0207530 | A1 * | 7/2021 | Muldoon | F02C 3/107 |
| 2021/0254556 | A1 * | 8/2021 | Asselin | B64C 21/01 |
| 2021/0348564 | A1 * | 11/2021 | Mackin | B64D 41/00 |
| 2022/0194613 | A1 * | 6/2022 | Lima | B60L 50/30 |
| 2023/0046394 | A1 | 2/2023 | Sampedro-Thompson | |
| 2023/0056909 | A1 * | 2/2023 | Gusman | B64D 31/06 |
| 2023/0136062 | A1 * | 5/2023 | Amari | B64D 31/06 701/4 |
| 2023/0139190 | A1 * | 5/2023 | Amari | B60L 50/16 244/62 |
| 2024/0190556 | A1 * | 6/2024 | Page | B64C 39/10 |
| 2024/0262526 | A1 * | 8/2024 | Rawdon | B64D 37/32 |
| 2025/0042558 | A1 | 2/2025 | Carle | |
| 2025/0076893 | A1 * | 3/2025 | Pradines De Menezes Junior | G05D 1/644 |
| 2025/0242933 | A1 * | 7/2025 | Vassberg | B64D 27/40 |

FOREIGN PATENT DOCUMENTS

| | | |
|---|---|---|
| FR | 3127025 | 3/2023 |
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

OTHER PUBLICATIONS

"NASA Designates Boeing's Transonic Truss-braced Wing Concept As An X-Plane"; FUTUREFLIGHT, Alcock, Charles (Managing Editor); Jun. 13, 2023, 2 pgs.

Guynn Mark D et al: "Initial Assessment of Open Rotor Propulsion Applied to an Advanced Single-Aisle Aircraft", 11TH Aiaa Aviation Technology, Integration, and Operations (ATIO) Conference, [Online] Sep. 22, 2011 (Sep. 22, 2011), XP093418178, 11th AIAA Aviation Technology, Integration, and Operations (ATIO) Conference DOI: https://doi.org/10.2514/6.2011-7059 Retrieved from the Internet: URL:https://ntrs.nasa.gov/api/citations/20110015875/downloads/20110015875.pdf>.

* cited by examiner

AIRCRAFT ENGINE TAKEOFF AND CLIMB THRUST CONTROL

TECHNICAL FIELD

The present disclosure relates generally to the operation of an aircraft engine.

BACKGROUND

In aeronautics, the aspect ratio of a wing is the ratio of its span to its mean chord. It is equal to the square of the wingspan divided by the wing area. Aspect ratio and other features of the platform affect the aerodynamic efficiency of a wing because the lift-to-drag ratio increases with aspect ratio, improving the fuel economy in airplanes. Conventionally, uses of high aspect ratio wing aircraft have been limited to smaller propeller aircraft designed to cruise at relatively lower altitudes and speeds. Various design and operational challenges are present to make high aspect ratio wing aircraft viable for commercial flights.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which.

Figure 1:
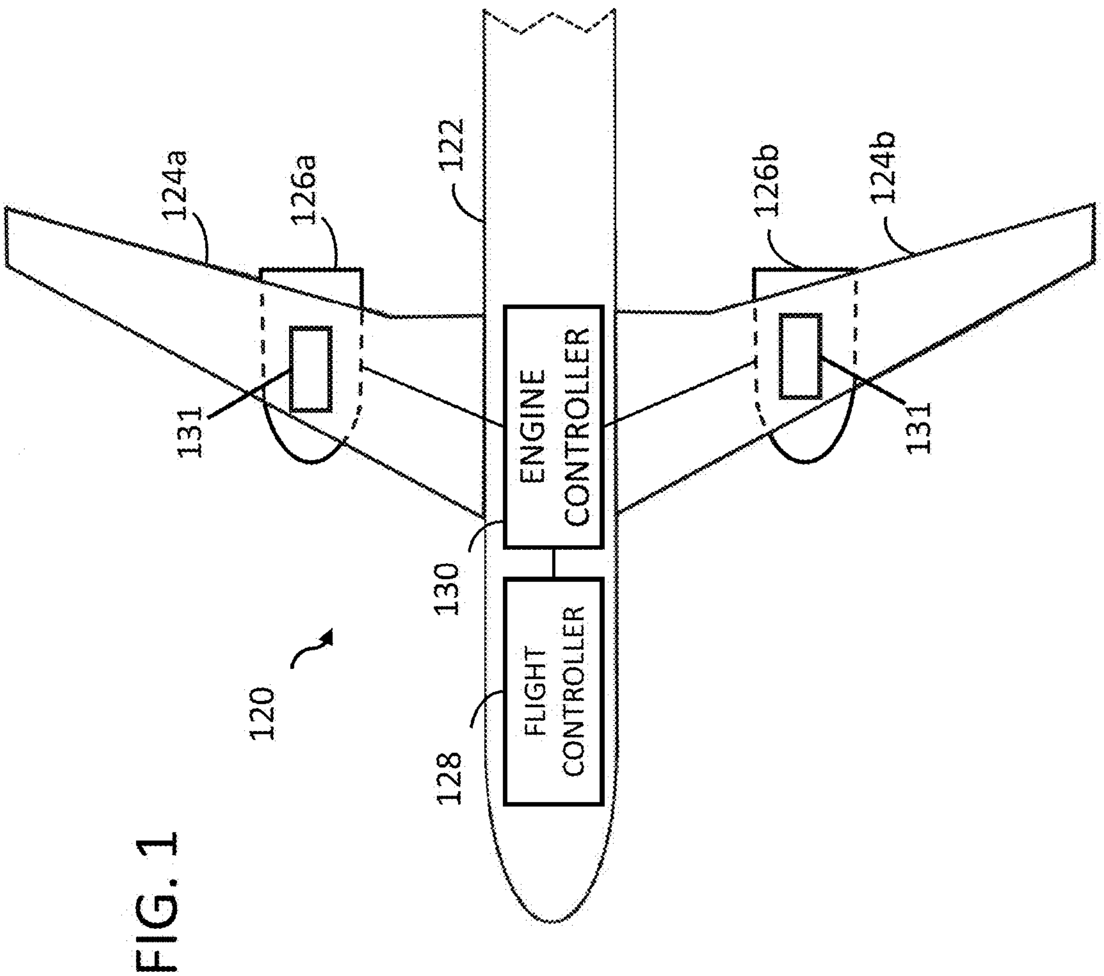
FIG. 1 comprises a diagram of an aircraft according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment.

Thus, it is intended that the present disclosure covers such modifications and variations as come within the scope of the appended claims and their equivalents.

As used herein, the terms "first," "second," "third," etc. may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, one or both endpoints defining numerical ranges, and/or the margin for ranges between endpoints. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The terms "forward" and "aft" refer to relative positions within a gas turbine engine or vehicle, and are based on a normal operational attitude of the gas turbine engine or vehicle. More particularly, forward and aft are used herein with reference to a direction of travel of the vehicle and a direction of propulsive thrust of the gas turbine engine. The terms "upstream" and "downstream" refer to the relative direction with respect to fluid flow in a fluid pathway. For example, "upstream" refers to the direction from which the fluid flows, and "downstream" refers to the direction to which the fluid flows.

The term "leading edge" refers to components and/or surfaces which are oriented predominately upstream relative to the fluid flow of the system, and the term "trailing edge" refers to components and/or surfaces which are oriented predominately downstream relative to the fluid flow of the system.

"Blade" can refer to a stationary or rotating blade. "Stationary blade(s)" has the same meaning as "vane(s)".

"Unducted aircraft engine" as used herein mean an aircraft engine characterized by an array of rotating fan blades and static (or non-rotating) outlet guide vanes (OGV) aft of the array of rotating fan blades, or an array of rotating fan blades and static, unducted inlet guide vanes (IGV) forward of the rotating fan blades. In either case, neither the fan blades nor the IGV or OGV is surrounded by a duct or fan nacelle.

During a flight mission, an aircraft typically goes through a takeoff phase, a climb phase, a cruise phase, a descend phase, an approach phase, and a landing phase.

"Takeoff" (TO) refers to the phase of a flight where the aircraft transitions from being stationary on the ground, to becoming airborne, and ends with a reduction of throttle to enter the climb phase, which may occur at between 10-20% of cruising altitude. During takeoff, the engine operates at or near maximum thrust to generate the necessary speed and lift in a takeoff mode.

"Climb" refers to the phase of a flight following takeoff where the aircraft ascends to a specified cruising altitude. During the climb phase, the engine continues to operate at higher thrust, though typically less than the maximum takeoff thrust. The climb phase may be characterized by a rate of climb exceeding 500, 1000, or 1500 feet per minute (fpm). In some embodiments, the rate of climb during the climb phase may be between 2500 to 3500 fpm.

"Cruise" or "cruise flight" refers to a phase of flight in which an aircraft levels in altitude ("cruise altitude") after the climb phase and prior to the descend phase. An aircraft engine operates in a cruise mode during the cruise phase, which is generally at a cruise speed that is from 50% to 90% of a rated speed, such as from 70% to 80% of the rated speed. In various flight envelopes, the cruise operating mode is exemplified by the operating mode of the gas turbine engine at a midpoint of the particular flight envelope based on a total fuel burn for the flight envelope (e.g., when the gas turbine engine has burned 50% of the total fuel burn for that gas turbine engine during the flight operation). During cruise, operating conditions may be between 50% to 100% of the engine's maximum effective altitude where the aircraft rate of climb or rate of descent is less than +/−500 feet per minute. The maximum effective altitude generally refers to the highest altitude at which the aircraft can maintain level flight with a given power setting and load, and may be defined in an aircraft's specification by an aircraft manufacturer.

In various examples, cruise flight may take place at a cruise altitude up to approximately 65,000 feet (ft.). In certain examples, cruise altitude is between approximately 28,000 ft. and approximately 45,000 ft. In yet other examples, cruise altitude is expressed in flight levels (FL) based on a standard air pressure at sea level, in which cruise flight is between FL280 and FL650. In another example, cruise flight is between FL280 and FL450. In still certain examples, cruise altitude is defined based at least on a barometric pressure, in which cruise altitude is between approximately 4.85 pounds per square inch absolute (psia) and approximately 0.82 psia based on a sea-level pressure of approximately 14.70 psia and sea-level temperature at approximately 59 degrees Fahrenheit. In another example, cruise altitude is between approximately 4.85 psia and approximately 2.14 psia. It should be appreciated that, in certain examples, the ranges of cruise altitude defined by pressure may be adjusted based on a different reference sea-level pressure and/or sea-level temperature.

"Top of climb" (ToC) refers to the period in a climb phase of the flight just prior to entering the cruise phase. During ToC, the rate of climb of an aircraft transitions from the peak rate of climb to the lower rate of climb in the cruise phase. In one example, ToC is the last one or two thousand feet of altitude gain, prior to reaching cruise altitude. In another example, ToC is the last two minutes of the climb phase prior to transitioning to a cruise phrase.

"ToC thrust" refers to an average thrust produced by the engine during the ToC period.

"ToC ambient static pressure" refers to the average ambient static pressure measured during the ToC period. As an example, ToC could occur at an altitude between 30,000 and 40,000 and the ToC ambient static pressure could be between 4.373 psia to 2.730 psia.

"TO thrust" refers to the maximum thrust produced by an engine during the takeoff phase of flight. This is typically at or close to the maximum thrust listed in the engine type certificate data sheet, and is greater than an average thrust of the cruise phase.

"TO ambient static pressure" refers to the atmospheric pressure measured at the aircraft's takeoff location during the takeoff phase of flight, typically between 11 to 15 psi.

The aspect ratio of a wing the ratio of the wing's span to its average chord width, which can be calculated as the square of the wingspan divided by the projected wing area.

High Aspect Ratio Wing (HARW) and Ultra-High Aspect Ratio Wing (UHARW) aircraft are areas of active development for the next-generation transport aircraft with increased fuel efficiency and performance. Generally, HARW refers to aircraft with wings having an aspect ratio between 10 to 20 and UHARW refers to aircraft with wings having an aspect ratio above 20. HARW and UHARW designs can be strut-braced or truss-braced wings to support the wingspan and manage bending moments. Because of the reduced drag and increased lift in HARW and UHARW designs, these aircraft can takeoff at a lower speed and climb with less component stress and greater efficiency.

The present disclosures generally describe aircraft engine control parameters configured for HARW aircraft, which take advantage of the benefits of HARW designs by controlling the thrust output of the engine at different phases of flight at a thrust ratio that increases fuel efficiency. While HARW is generally described herein, in some embodiments, the disclosure also applies to engines of UHARW aircraft.

In aspects, approaches are provided that control operations of one or more engines of an aircraft during a mission such that a thrust ratio of the ToC thrust produced by each of the one or more engines as normalized by a ToC ambient static pressure to a TO thrust normalized by a TO ambient static pressure is in the range of 1.1 to 1.6. In other examples, the range is 1.13 to 1.5. The TO and ToC thrusts of the engine are, in part, limited by the design and dimensions of engine components. TO thrust, for example, typically is at or near the maximum rated thrust output of the engine. As such, in some embodiments, the core and the fan of an engine for an HARW aircraft are sized based on the thrust ratio described herein. In some embodiments, the thrust ratios may be implemented through a flight controller, such as an autothrottle system, and/or an engine controller, such as a Full Authority Digital Engine Control (FADEC).

As will be described herein, operating the engine according to the above-mentioned thrust ratio means that the ToC thrust is closer to that of TO thrust, and the engine's maximum rated thrust, compared to conventional commercial aircraft engines. An engine designed and operated with the described thrust ratios allows HARW aircraft to complete climb at greater speed and with improved fuel efficiency. This operation allows the aircraft to reach a cruising altitude in a reduced amount of time, thereby increasing the duration of the fuel-efficient cruise phase.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Referring now to FIG. 1, one example of an aircraft 120 is described. The aircraft includes a fuselage 122, a pair of wings 124*a*, 124*b* extending from the fuselage 122, a flight controller 128, an engine controller 130 in communication with the flight controller 128, and engines 126*a*, 126*b* structurally coupled to the wings 124*a*, 124*b* (further communicatively coupled to the engine controller 130). Alternatively, or in addition, the engines 126*a*, 126*b* are coupled to the fuselage 122.

The fuselage 122 is the main body section of the aircraft 120 and holds crew, passengers, cargo, or other items. The fuselage 122 is coupled to stabilization and lifting elements of the aircraft 120 such as the wings 124*a*, 124*b*. In some embodiments, the passenger count of the aircraft is 270 or fewer. That is, the fuselage is dimensioned and arranged to hold 270 or fewer passengers, and may be narrow body and/or a single aisle passenger aircraft.

The wings 124*a*, 124*b* are coupled to the fuselage 122 and provide lift for the aircraft 120. The wings of the aircraft may be HARW or UHARW, having a wing aspect ratio greater than 10, such as between 10 to 20.

In some embodiments, a truss (or trusses) is coupled between each wing 124*a*, 124*b* and the fuselage 122. The truss may stabilize the wing and allow the aircraft to have larger engines coupled to the wing than normally would be possible. An illustration of a truss-braced wing is provided in FIG. 3. In some embodiments, wings 124*a*, 124*b* of the aircraft may include folding wing tips that can be moved or folded via hinges downwards or upwards. For example, the wing tips of a HARW aircraft may be folded when entering a terminal to allow the HARW plane to operate at spaces dimensioned for conventional aircraft with smaller wingspans.

The engines 126*a*, 126*b* may be unducted or ducted aircraft engines. The aircraft 120 generally includes two or more engines, such as two, three, or four engines. The particular approaches described herein are particularly applicable to unducted aircraft engines. A turbofan engine operates on the principle that a central gas turbine core drives a bypass fan, the bypass fan being located at a radial location between a fan duct and the engine core. An unducted propulsion system operates on the principle of having the bypass fan not located within a fan duct. Removal of the fan duct permits the use of larger fan blades able to act upon a larger volume of air than a bypass fan located within a fan duct. An unducted propulsion system can have an improved propulsive efficiency over a ducted turbofan engine. An example of an unducted turbofan is described with reference to FIG. 5 herein. The engine may be an open rotor engine including a rotor and stator vanes aft of the rotor. The engine may be an open rotor engine including counter-rotating rotors. The engine may further include an annular core inlet. In some embodiments, the engine may be a reverse-flow engine.

In some embodiments, the maximum thrust produced by each of the one or more engines 126*a*, 126*b* is less than 50,000 lbs (approximately 222,400 Newtons). In some embodiments, each of the one or more engines 126*a*, 126*b* is configured to have a bypass ratio (BPR) of 15 to 100. In some embodiments, the BPR of the engines is 10.0 or higher. The BPR of a turbofan engine is the ratio between the mass flow rate of a bypass stream (moving around an engine core) to the mass flow rate entering the engine core. A 10:1 BPR, for example, means that 10 kg of air passes through the bypass duct for each 1 kg of air passing through the core. In some embodiments, the engines 126*a*, 126*b* are configured to have a fan pressure ratio (FPR) of 1.05 to 1.5. The FPR is the ratio of the pressure of the air after it passes through the fan to the pressure of the air before it enters the fan. In a turbofan engine, the FPR is a variable that affects specific fuel consumption (SFC). For a given BPR, there is an optimal FPR that minimizes SFC. That is, FPR is generally chosen to balance BPR to increase fuel efficiency.

The aircraft 120 includes a flight controller 128 that provides instructions to the engine controller 130 during a flight mission. The flight controller 128 may be any microcontroller, computer, or processor-based device with processor, memory, and programmable input/output peripherals (or multiple ones of these elements), which is generally designed to govern the operation of other components and devices. In some embodiments, the aircraft 120 includes an autopilot system that automates controls during one or more of takeoff, climb, cruise, descent, approach, and/or landing phases of a flight. In some embodiments, the flight controller 128 further includes an autothrottle system that receives commands from the autopilot system and/or a pilot interface to provide a target engine thrust to the engine controller 130 to maintain/achieve the altitude and speed. In some embodiments, the autopilot system and/or the autothrottle system may further provide a mode selection to the engine controller 130 indicating the current phase of flight (e.g., takeoff, climb, cruise, descent, landing, etc.). In some embodiments, the flight controller 128 includes a pilot interface in a crew compartment (e.g., a cockpit) to allow the crew (e.g., pilot and/or co-pilot) of the aircraft 120 to control flight operations of the aircraft 120, and the autothrottle system may provide commands to the engine controller 130 based on pilot interface controls.

The engine controller 130 may be any microcontroller, computer, or processor-based device with processor, memory, and programmable input/output peripherals (or multiple ones of these elements), which is generally designed to govern the operation of other components and devices. In some embodiments, the engine controller 130 includes a FADEC. In some embodiments, a separate FADEC controller may be assigned to each engine 126*a*, 126*b*. The engine controller 130 is generally configured to execute methods described herein, including the method shown in FIG. 2, when the method are embodied in software programing. That is, a computer-readable storage medium may have stored thereon instructions that, when executed by a processor of the aircraft and/04 the engine controller 130, that cause the processor to perform the method for controlling operation of one or more engines in an aircraft as described with reference to FIG. 2.

The engine controller 130 is configured to receive commands from the flight controller 128 and adjusts operations of the engines 126*a* and 126*b* to conform to or implement these commands. When a target thrust is commanded from a flight controller 128, the engine controller 130 converts these commands into electronic instructions to alter the operation of one or more thrust effectors 131 of the engines 126*a*, 126*b* to produce thrust. Thrust effectors 131 generally refer to engine components that can change the thrust output of the engine. In some embodiments, thrust effectors 131 may include one or more variable pitch fan blades, a fuel flow controller, a plurality of variable stator vanes, a plurality of inlet guide vanes, a plurality of outlet guide vanes, a variable nozzle, an electric motor, etc. Descriptions of engine components that may function as thrust effectors are provided in more detail with reference to FIG. 5. In some embodiments, the controls of the one or more thrust effectors 131 may further be determined by the engine controller 130 based on the mode selection received from the flight controller 128 to increase engine efficiency. For example, the selection of specific thrust effectors 131 altered to achieve a target thrust may differ based on the mode selection.

In some embodiments, the flight controller 128 and/or the engine controller 130 is configured to operate the engines 126*a*, 126*b* such that a ratio of a ToC thrust produced by each of the one or more engines 126*a*, 126*b* at the top of the climb (as normalized by a ToC ambient static pressure associated with the top of climb) to a takeoff (TO) thrust produced by the one or more engines 126*a*, 126*b* at takeoff (as normalized by a TO ambient static pressure associated with takeoff) is in the range of 1.1 to 1.6. In other examples, the range is 1.13 to 1.5. In examples, the relationship between the ToC altitude and the climb speed is such that the time to reach the top of climb is less than 40 minutes. The ToC period generally ends at an altitude that is above 28,000 ft. In some embodiments, the flight controller 128 and/or the engine controller 130 may be physically separated processor-based devices or an single integrated control unit.

Figure 2:
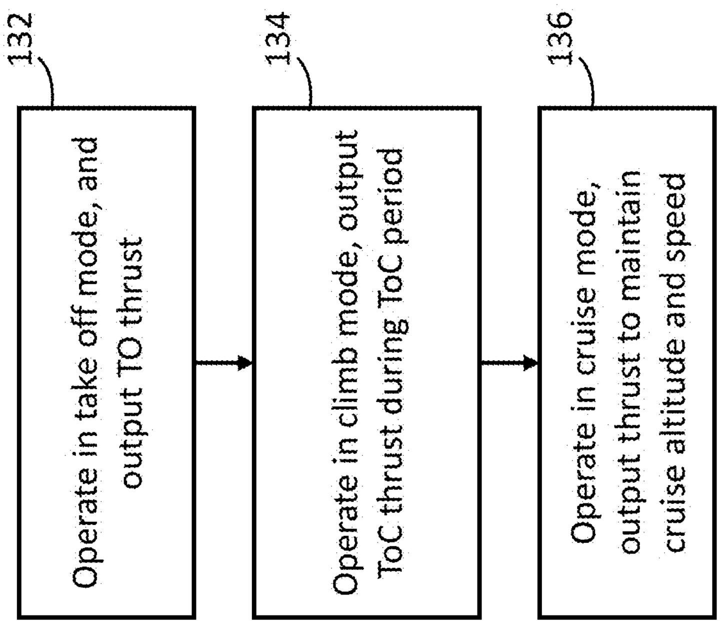
FIG. 2 comprises a flowchart of a method for controlling the thrust output of an aircraft engine according to some embodiments.

Referring now to FIG. 2, one example of a method for operating aircraft engines is described. In some embodiments, the steps in FIG. 2 may be performed by one or more processor-based devices controlling one or more thrust effectors of one or more aircraft engines. In some embodiments, the steps of FIG. 2 may be performed by the aircraft 120 and/or engine controller 130 via directly or indirectly controlling one or more thrust effectors 131 as described in FIG. 1. The steps may be embodied as software and be stored as computer executable code stored on a computer-readable storage medium for execution by a processor, such as a processor in the aircraft 120 and/or engine controller 130.

At step 132, the aircraft is in the takeoff phase and the engine operates in a takeoff mode. During takeoff, the engines are commanded to produce TO thrust, which may be at or near the maximum thrust rating of the engine to achieve lift for takeoff. For HARW aircraft, the lift to takeoff may be achieved at lower speeds as compared to conventional commercial aircraft with shorter wingspans. Therefore, the TO thrust for HARW aircraft may also be lower compared to conventional commercial aircraft. In some embodiments, TO thrust may be in the range of 25,000 to 40,000 lbs thrust for a single aisle airliner with 100-330 passengers or 8000-26000 lbs thrust for a regional jet with 50-160 passengers.

At step 134, the aircraft is airborne and enters the climb phase to gain altitude. The engine also switches from takeoff mode to a climb mode. During the climb phase, the thrust output of the engine may gradually throttle back to maintain a target climb speed. The climb phase includes an initial climb period and a ToC period just prior to entering the cruise phase. The average thrust of the engine in the ToC period is referred to as ToC thrust. In some embodiments, ToC thrust may be in the range of that is less than 90% of the takeoff thrust and greater than the cruise thrust.

In steps 132 and 134, the engine is operated with a thrust ratio defined by:

$$\frac{Fn\_ToC \times Ps\_toc}{Fn\_TO \times Ps\_TO}$$

where Fn_ToC is the average thrust during the ToC period. Ps_ToC is an ambient static pressure during the ToC period. Fn_TO is the maximum thrust produced by the engine at takeoff, which may be the maximum rated thrust of the engine. Ps_TO is the ambient static pressure during takeoff. The two thrust values (Fn_ToC and Fn_TO) are normalized by the ambient static pressures (Ps_ToC and Ps_TO) so that variations in cruising altitudes are removed from the ratio.

In steps 132 and 134, the engine is controlled to produce TO thrust and ToC thrust a with thrust ratio between 1.2 to 1.6. In some embodiments, the thrust ratio is between 1.13 to 1.5.

At step 136, the aircraft completes the climb phase and enters the cruise phase. In some embodiments, the process may move from step 134 and 136 when a flight controller senses a target cruise altitude (e.g., based on altimeter data) and issues a command for the engine to enter cruise mode. During the cruise phase, the engine is operated at a steady thrust to maintain the aircraft at a cruise speed. The engine controller is generally configured to control the one or more engines to cause the aircraft to cruise at 0.5 Mach or above;

After step 136, the flight may continue into descend, approach, and landing phases. These subsequent phases do not affect the thrust ratio as described herein, and are omitted for brevity.

Figure 3:
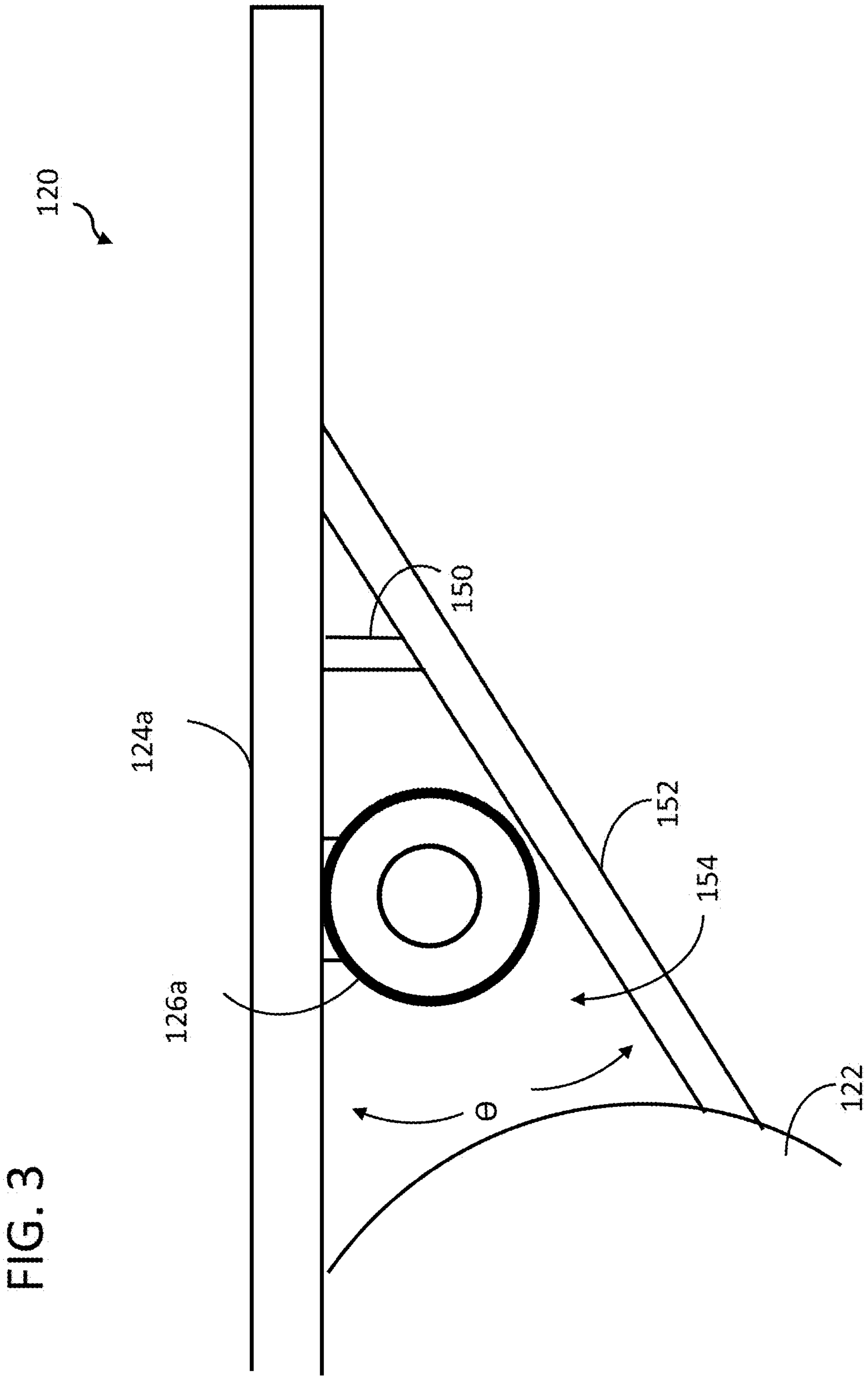
FIG. 3 comprises an illustration of a truss-braced wing according to some embodiments.

Referring now to FIG. 3, an illustration of a wing with truss bracing is shown. The systems and methods described with reference to FIGS. 1 and 2 may be implemented with an aircraft with truss-braced wings.

In this example, the engine 126*a* is attached to the wing 124*a*. The wing 124*a* is attached to the fuselage 122. A truss 152 extends from the fuselage 122 to the wing 124*a* to support and stabilize the wing when the aircraft 120 is operating. The truss 152 may be constructed of an appropriate material such as metal or alloy. A strut 150 is attached from the truss 152 to the wing 124*a*, providing further support and stability. The use of the truss 152 and strut 150 may also result in the ability to increase the size or weight of any engine attached to the wing 124*a*. The truss 152 is angled upwardly at an angle θ relative to the wing 124*a*. A channel 154 is formed between the truss 152 and the wing 124*a* and it is in this opening where the engine 126*a* is placed. It will be understood that the truss 152 may take many shapes, dimensions, and configurations. For example, the wing 124*a* could be a low-mount wing where the truss 152 connects to an upper portion of the fuselage 122.

Figure 4:
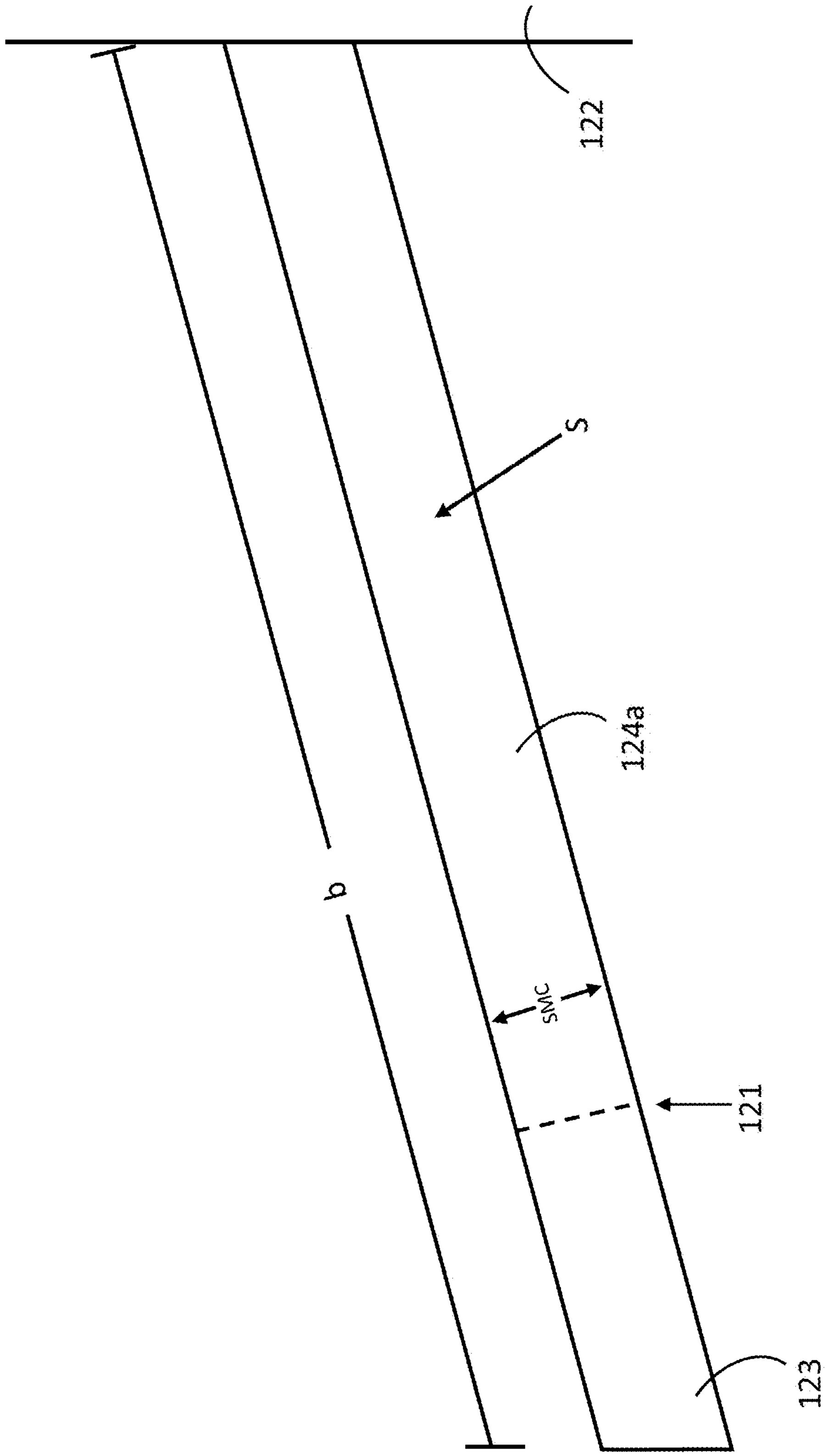
FIG. 4 comprises a diagram of a top down view of a wing with a high aspect ratio according to some embodiments.

Referring now to FIG. 4, one example of top-down view of a wing of an aircraft that may assume various aspects ratios is described. As shown in FIG. 4, the wing 124*a* has a span b, a standard mean chord (SMC), and a projected surface area S. The wing aspect ratio AR is the ratio of the square of the wingspan b to the projected wing area S, which is equal to the ratio of the wingspan b to the SMC. For a HARW aircraft operated based on the thrust ratio described herein, the aspect ratio may be greater than 10, or between 10 and 20. Aspects of the present disclosure may also be applicable to UHARW aircraft with a wing aspect ratio of greater than 20.

In some examples, a wing tip 123 may fold upwards along a line 121. Folding the wing upwards is advantageous because it allows the aircraft to operate in airports where space is tight. Because of the high aspect ratio of the wing, the wing would be too long to fit in the confined boarding areas in many airports.

Figure 5:
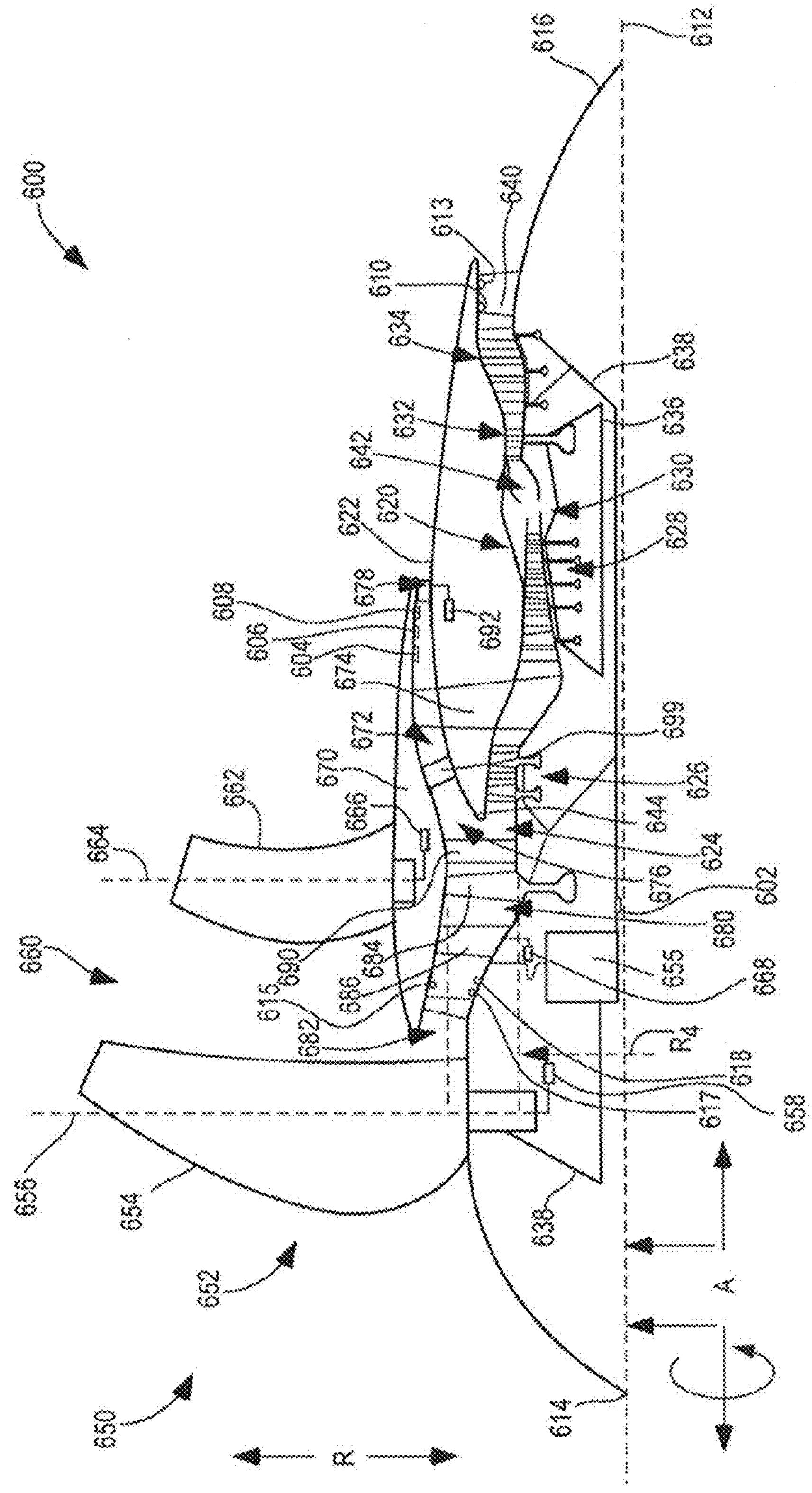
FIG. 5 comprises a schematic illustration of an unducted turbine engine according to some embodiments.

In FIG. 5, a schematic cross-sectional view of a gas turbine engine is provided, and this type of engine can be utilized in any of the approaches or as any of the engines described herein. Particularly, FIG. 5 provides an engine having a rotor assembly with a single stage of unducted rotor blades. In such a manner, the rotor assembly may be referred to herein as an "unducted fan," or the entire engine 600 may be referred to as an "unducted aircraft engine." In addition, the engine of FIG. 5 includes a third stream extending from the compressor section to a rotor assembly flow path over the turbomachine, as will be explained in more detail below.

For reference, the engine 600 defines an axial direction A, a radial direction R, and a circumferential direction C. Moreover, the engine 600 defines an axial centerline or central axis 612 that extends along the axial direction A. In general, the axial direction A extends parallel to the central axis 612, the radial direction R extends outward from and inward to the central axis 612 in a direction orthogonal to the axial direction A, and the circumferential direction extends three hundred sixty degrees (360°) around the central axis 612. The engine 600 extends between a forward end 614 and an aft end 616, e.g., along the axial direction A.

The engine 600 includes a turbomachine 620 and a rotor assembly, also referred to as a fan section 650, positioned upstream thereof. Generally, the turbomachine 620 includes, in serial flow order, a compressor section, a combustion section, a turbine section, and an exhaust section defining an annular core inlet 624. The core cowl 622 further encloses at least in part a low-pressure system and a high-pressure system. For example, the core cowl 622 depicted encloses and supports at least in part a booster or low-pressure ("LP") compressor 626 for pressurizing the air that enters the turbomachine 620 through the annular core inlet 624. A high-pressure ("HP"), multi-stage, axial-flow compressor 628 receives pressurized air from the LP compressor 626 and further increases the pressure of the air. The pressurized air stream flows downstream to a combustor 630 of the combustion section where fuel is injected into the pressurized air stream and ignited to raise the temperature and energy level of the pressurized air.

It will be appreciated that as used herein, the terms "high/low speed" and "high/low pressure" are used with respect to the high-pressure/high speed system and low-pressure/low speed system interchangeably. Further, it will be appreciated that the terms "high" and "low" are used in this same context to distinguish the two systems and are not meant to imply any absolute speed and/or pressure values.

The high energy combustion products flow from the combustor 630 downstream to a high-pressure turbine 632. The high-pressure turbine 632 drives the HP compressor 628 through a high-pressure shaft 636. In this regard, the high-pressure turbine 632 is drivingly coupled with the HP compressor 628. The high energy combustion products then flow to a low-pressure turbine 634. The low-pressure turbine 634 drives the LP compressor 626 and components of the fan section 650 through a low-pressure shaft 638. In this regard, the low-pressure turbine 634 is drivingly coupled with the LP compressor 626 and components of the fan section 650. The LP shaft 638 is coaxial with the HP shaft 636 in this example embodiment. After driving each of the turbines 632, 634, the combustion products exit the turbomachine 620 through a turbomachine exhaust nozzle 640.

Accordingly, the turbomachine 620 defines a working gas flow path or core duct 642 that extends between the annular core inlet 624 and the turbomachine exhaust nozzle 640. The core duct 642 is an annular duct positioned generally inward of the core cowl 622 along the radial direction R. The core duct 642 (e.g., the working gas flow path through the turbomachine 620) may be referred to as a second stream.

The fan section 650 includes a fan 652, which is the primary fan in this example embodiment. For the depicted embodiment of FIG. 5, the fan 652 is an open rotor or unducted fan. As depicted, the fan 652 includes an array of fan blades 654 (only one shown in FIG. 5). The fan blades 654 are rotatable, e.g., about the central axis 612. As noted above, the fan 652 is drivingly coupled with the low-pressure turbine 634 via the LP shaft 638. For the embodiments shown in FIG. 5, the fan 652 is coupled with the LP shaft 638 via a speed reduction gearbox 655, e.g., in an indirect-drive or geared-drive configuration.

Moreover, the fan blades 654 can be arranged in equal spacing around the central axis 612. Each fan blade 654 has a root and a tip, and a span defined therebetween.

Moreover, each fan blade 654 defines a central blade axis 656. For this embodiment, each fan blade 654 of the fan 652 is rotatable about their respective central blade axes 656, e.g., in unison with one another. One or more actuators 658 are provided to facilitate such rotation and therefore may be used to change the pitch of the fan blades 654 about their respective central blade axes 656.

The fan section 650 further includes a fan guide vane array 660 that includes fan guide vanes 662 (only one shown in FIG. 5) disposed around the central axis 612. For this embodiment, the fan guide vanes 662 are not rotatable about the central axis 612. Each fan guide vane 662 has a root and a tip, and a span defined therebetween. The fan guide vanes 662 may be unshrouded as shown in FIG. 5 or, alternatively, may be shrouded, e.g., by an annular shroud spaced outward from the tips of the fan guide vanes 662 along the radial direction R or attached to the fan guide vanes 662.

Each fan guide vane 662 defines a central blade axis 664. For this embodiment, each fan guide vane 662 of the fan guide vane array 660 is rotatable about their respective central blade axes 664, e.g., in unison with one another. One or more actuators 666 are provided to facilitate such rotation and therefore may be used to change a pitch of the fan guide vane 662 about their respective central blade axes 664. In other embodiments, each fan guide vane 662 may be fixed or unable to be pitched about its central blade axis 664. The fan guide vanes 662 are mounted to a fan cowl 670.

As shown in FIG. 5, in addition to the fan 652, which is unducted, a ducted fan 684 is included aft of the fan 652, such that the engine 600 includes both a ducted and an unducted fan which both serve to generate thrust through the movement of air without passage through at least a portion of the turbomachine 620 (e.g., without passage through the HP compressor 628 and combustion section for the embodiment depicted). The ducted fan is rotatable at about the same axis as the fan blade 654. The ducted fan 684 is, for the embodiment depicted, driven by the low-pressure turbine 634 (e.g., coupled to the LP shaft 638). In the embodiment depicted, as noted above, the fan 652 may be referred to as the primary fan, and the ducted fan 684 may be referred to as a secondary fan. It will be appreciated that these terms "primary" and "secondary" are terms of convenience, and do not imply any particular importance, power, or the like.

The ducted fan 684 includes a plurality of fan blades (not separately labeled in FIG. 5). The fan blades of the ducted fan 684 can be arranged in equal spacing around the central axis 612. Each blade of the ducted fan 684 has a root and a tip, and a span defined therebetween.

The fan cowl 670 annularly encases at least a portion of the core cowl 622 and is generally positioned outward of at least a portion of the core cowl 622 along the radial direction R. Particularly, a downstream section of the fan cowl 670 extends over a forward portion of the core cowl 622 to define a fan flow path or fan duct 672. According to this aspect, the fan flow path or fan duct 672 may be understood as forming at least a portion of the third stream of the engine 600.

Incoming air may enter through the fan duct 672 through a fan duct inlet 676 and may exit through a fan exhaust nozzle 678 to produce propulsive thrust. The fan duct 672 is an annular duct positioned generally outward of the core duct 642 along the radial direction R. The fan cowl 670 and the core cowl 622 are connected together and supported by a plurality of substantially radially extending, circumferentially spaced stationary struts 674 (only one shown in FIG. 5). The stationary struts 674 may each be aerodynamically contoured to direct air flowing thereby. Other struts in addition to the stationary struts 674 may be used to connect and support the fan cowl 670 and/or core cowl 622. In many embodiments, the fan duct 672 and the core duct 642 may at least partially co-extend (generally axially) on opposite sides (e.g., opposite radial sides) of the core cowl 622. For example, the fan duct 672 and the core duct 642 may each extend directly from the leading edge 644 of the core cowl 622 and may partially co-extend generally axially on opposite radial sides of the core cowl.

The engine 600 also defines or includes an inlet duct 680. The inlet duct 680 extends between an engine inlet 682 and the core inlet 624/fan duct inlet 676. The engine inlet 682 is defined generally at the forward end of the fan cowl 670 and is positioned between the fan 652 and the fan guide vane array 660 along the axial direction A. The inlet duct 680 is an annular duct that is positioned inward of the fan cowl 670 along the radial direction R. Air flowing downstream along the inlet duct 680 is split, not necessarily evenly, into the core duct 642 and the fan duct 672 by a splitter or leading edge 644 of the core cowl 622. The inlet duct 680 is wider than the core duct 642 along the radial direction R. The inlet duct 680 is also wider than the fan duct 672 along the radial direction R.

During operation of the engine 600 at an operating condition, the engine 600 generates a total thrust, $Fn_{Total}$. The operating condition may be operation of the engine 600 at a rated speed during standard day operating condition. The total thrust is a sum of a first stream thrust, $Fn_1s$ (e.g., a primary fan thrust generated by an airflow over the fan cowl 670 and core cowl 622, generated by the fan 652), a third stream thrust, $Fn_3s$ (e.g., a thrust generated by an airflow through the fan duct 672 exiting through the fan exhaust nozzle 678, generated at least in part by the ducted fan 684), and a second stream thrust, $Fn_2s$ (e.g., a thrust generated by an airflow through the core duct 642 exiting through the turbomachine exhaust nozzle 640).

Notably, for the embodiment depicted, the engine 600 includes one or more features to increase an efficiency of the third-stream thrust, $Fn_3s$. In particular, the engine 600 further includes an array of inlet guide vanes 686 positioned in the inlet duct 680 upstream of the ducted fan 684 and downstream of the engine inlet 682. The array of inlet guide vanes 686 are arranged around the central axis 612. For this embodiment, the inlet guide vanes 686 are not rotatable about the central axis 612. Each inlet guide vane 686 defines a central blade axis (not labeled for clarity), and is rotatable about their respective central blade axes, e.g., in unison with one another. One or more actuators 668 are provided to facilitate such rotation and therefore may be used to change a pitch of the inlet guide vanes 686 about their respective central blade axes. In other embodiments, each inlet guide vanes 686 may be fixed or unable to be pitched about its central blade axis.

Further, located downstream of the ducted fan 684 and upstream of the fan duct inlet 676, the engine 600 includes an array of outlet guide vanes 690. As with the array of inlet guide vanes 686, the array of outlet guide vanes 690 are not rotatable about the central axis 612. For the embodiment depicted, unlike the array of inlet guide vanes 686, the array of outlet guide vanes 690 are configured as fixed-pitch outlet guide vanes.

Further, it will be appreciated that for the embodiment depicted, the fan exhaust nozzle 678 of the fan duct 672 is further configured as a variable geometry exhaust nozzle. In such a manner, the engine 600 includes one or more actuators 692 for modulating the variable geometry exhaust nozzle. For example, the variable geometry exhaust nozzle may be configured to vary a total cross-sectional area (e.g., an area of the nozzle in a plane perpendicular to the central axis 612) to modulate an amount of thrust generated based on one or more engine operating conditions (e.g., temperature, pressure, mass flowrate, etc., of an airflow through the fan duct 672). A fixed geometry exhaust nozzle may also be adopted.

The combination of the array of inlet guide vanes 686 located upstream of the ducted fan 684, the array of outlet guide vanes 690 located downstream of the ducted fan 684, and the fan exhaust nozzle 678 may result in a more efficient generation of third-stream thrust, $Fn_3s$, during one or more engine operating conditions. Further, by introducing a variability in the geometry of the inlet guide vanes 686 and the fan exhaust nozzle 678, the engine 600 may be capable of generating more efficient third-stream thrust, $Fn_3s$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Referring still to FIG. 5, air passing through the fan duct 672 may be relatively cooler (e.g., lower temperature) than one or more fluids such as air utilized in the turbomachine 620. In this way, one or more heat exchangers 699 may be positioned in thermal communication with the fan duct 672. For example, one or more heat exchangers 699 may be disposed within the fan duct 672 and utilized to cool one or more fluids from the core engine with the air passing through the fan duct 672 as a resource for removing heat from a fluid, e.g., compressor bleed air, oil, or fuel.

Various sensors are shown in FIG. 5. Measurements from these sensors are utilized during ground and/or in-flight testing as has been described elsewhere herein. These sensors are coupled to a controller.

For example, an engine control torque sensor 602 is coupled to the LP shaft 638 to measure torque. At the exit through the fan exhaust nozzle 678, a first pressure sensor 604 (measuring total pressure), a second pressure sensor 606 (measuring static pressure), and a first temperature sensor 608 (measuring total temperature) are deployed. At the turbomachine exhaust nozzle 640, a third pressure sensor 610 (measuring total pressure) and a second temperature sensor 613 (measuring total temperature) are deployed. At the engine inlet 682, a fourth pressure sensor 615 (measuring total pressure), a fifth pressure sensor 617 (measuring static pressure), and a third temperature sensor 618 (measuring total temperature) are deployed. It will be appreciated that other sensors may be deployed at other locations and the sensors can be of the types described or other types.

Enhancing an aircraft's fuel efficiency is achievable by reducing the climb period, allowing the aircraft to spend more time in the fuel-efficient cruise phase. However, excessive thrust during the climb phase can overpower the engines, negating the fuel savings from a shorter climb. For example, conventional aircraft that cruises at 0.5 Mach or above generally operate with a thrust ratio lower than 1.1 to not overpower the engines during climb and cause excessive fuel burn. The methods and systems described herein provide an improved method of controlling engine thrust specifically for aircrafts with high aspect ratio wings. By adjusting the thrust ratio of the engine specifically for these aircraft, the climb phase is shortened without overpowering the engines during the TOC period, thereby significantly improving the overall fuel efficiency of high-aspect wing aircrafts.

Further aspects of the disclosure are provided by the subject matter of the following clauses:

A method of operating engines of an aircraft is provided. The method including: controlling operations of one or more engines of the aircraft during a mission including a takeoff phase, a climb phase, and a cruise phase, the climb phase including a top of climb (ToC) period prior to transitioning to the cruise phase; controlling the one or more engines to output a takeoff thrust during the takeoff phase, the takeoff thrust corresponding to a maximum thrust during the takeoff phase; controlling the one or more engines to output a ToC thrust during the ToC period, the ToC thrust corresponding to an average thrust during the ToC period; and controlling the one or more engines to cause the aircraft to cruise at 0.5 Mach or above; wherein the one or more engines is controlled such that a thrust ratio is between 1.1 to 1.6, the thrust ratio being defined as a ratio of the ToC thrust as normalized by a ToC ambient static pressure to the takeoff thrust as normalized by a takeoff ambient static pressure.

The method of any of the preceding clauses, wherein the engine is an open rotor engine including a rotor and stator vanes aft of the rotor.

The method of any of the preceding clauses, wherein the engine is an open rotor engine including counter-rotating rotors.

The method of any of the preceding clauses, wherein the engine includes an annular core inlet.

The method of any of the preceding clauses, wherein the aircraft include two or more engines.

The method of any of the preceding clauses, wherein the ToC period ends at an altitude above 28,000 ft.

The method of any of the preceding clauses, wherein the ToC period includes the last two minutes of the climb phase.

The method of any of the preceding clauses, wherein the ToC period includes the last one thousand or two thousand feet of altitude gain prior to reaching cruise altitude and entering the cruise phase.

The method of any of the preceding clauses, wherein the one or more engines are coupled to wings of the aircraft dimensioned to have a wing aspect ratio greater than 10.

The method of any of the preceding clauses, further including operating the aircraft to reach the top of climb in less than 40 minutes.

The method of any of the preceding clauses, wherein each of wings of the aircraft includes folding wing tips.

The method of any of the preceding clauses, wherein a truss is coupled between each wing of the aircraft and a fuselage.

The method of any of the preceding clauses, wherein the engines are coupled to a fuselage dimensioned to hold 270 or less passengers.

The method of any of the preceding clauses, further including controlling the thrust produced by each of the one or more engines to be less than 50,000 lbs.

The method of any of the preceding clauses, wherein each of the one or more engines is configured to have a bypass ratio of 15 to 100.

The method of any of the preceding clauses, wherein each of the one or more engines are configured to have a fan pressure ratio (FPR) of 1.05 to 1.5

A method of operating engines of an aircraft is provided. The method including: controlling operations of one or more engines of the aircraft during a mission including a takeoff phase, a climb phase, and a cruise phase, the climb phase including a top of climb (ToC) period prior to transitioning to the cruise phase; controlling the one or more engines to output a takeoff thrust during the takeoff phase, the takeoff thrust corresponding to a maximum thrust during the takeoff phase; and controlling the one or more engines to output a ToC thrust during the ToC period, the ToC thrust corresponding to an average thrust during the ToC period, and the ToC period ends at an altitude above 28,000 ft.; wherein the one or more engines is controlled such that a thrust ratio is between 1.1 to 1.6, the thrust ratio being defined as a ratio of the ToC thrust as normalized by a ToC ambient static pressure to the takeoff thrust as normalized by a takeoff ambient static pressure.

The method of any of the preceding clauses, wherein the engine is an open rotor engine including a rotor and stator vanes aft of the rotor.

The method of any of the preceding clauses, wherein the engine is an open rotor engine including counter-rotating rotors.

The method of any of the preceding clauses, wherein the engine includes an annular core inlet.

The method of any of the preceding clauses, wherein the aircraft include two or more engines.

The method of any of the preceding clauses, further including: controlling the one or more engines to cause the aircraft to cruise at 0.5 Mach or above;

The method of any of the preceding clauses, wherein the ToC period includes the last two minutes of the climb phase.

The method of any of the preceding clauses, wherein the ToC period includes the last one thousand or two thousand feet of altitude gain prior to reaching cruise altitude and entering the cruise phase.

The method of any of the preceding clauses, wherein the one or more engines are coupled to wings of the aircraft dimensioned to have a wing aspect ratio greater than 10.

The method of any of the preceding clauses, further including operating the aircraft to reach the top of climb in less than 40 minutes.

The method of any of the preceding clauses, wherein each of wings of the aircraft includes folding wing tips.

The method of any of the preceding clauses, wherein a truss is coupled between each wing of the aircraft and a fuselage.

The method of any of the preceding clauses, wherein the engines are coupled to a fuselage dimensioned to hold 270 or less passengers.

The method of any of the preceding clauses, further including controlling the thrust produced by each of the one or more engines to be less than 50,000 lbs.

The method of any of the preceding clauses, wherein each of the one or more engines is configured to have a bypass ratio of 15 to 100.

The method of any of the preceding clauses, wherein each of the one or more engines are configured to have a fan pressure ratio (FPR) of 1.05 to 1.5.

An aircraft engine is provided. The engine including: one or more thrust effectors; and an engine controller coupled to the one or more thrust effectors, wherein the engine controller is configured to control the one or more thrust effectors in a takeoff phase, a climb phase, and a cruise phase based on instructions received from a flight controller, wherein the climb phase ends with a top of climb (ToC) period that ends at an altitude above 28,000 ft; and wherein thrust produced by the engine is controlled by the engine controller such that a ratio of a Top of Climb (ToC) thrust produced by each of the engine as normalized by a ToC ambient static pressure to a takeoff (TO) thrust at takeoff as normalized by a TO ambient static pressure is in a range of 1.1 to 1.6.

The engine of any of the preceding clauses, wherein the thrust produced by the engine is less than 50,000 lbs.

The engine of any of the preceding clauses, wherein the engine is configured to have a bypass ratio of 15 to 100.

The engine of any of the preceding clauses, wherein the engine is configured to have a fan pressure ratio (FPR) of 1.05 to 1.5.

An aircraft is provided. The aircraft including: the aircraft engine of any of the preceding clauses; a fuselage; and a pair of wings.

The aircraft of any of the preceding clauses, wherein the wings of the aircraft are dimensioned to have a wing aspect ratio greater than 10.

The engine of any of the preceding clauses, wherein a time to reach the top of climb is less than 40 minutes.

The engine of any of the preceding clauses, wherein each wing of the pair of wings of the aircraft includes a folding wing tip.

The engine of any of the preceding clauses, wherein a truss is coupled between each wing of the aircraft and the fuselage.

A computer-readable storage medium having stored thereon instructions that, when executed by a processor, cause the processor to perform a method for controlling the operation of engines in an aircraft, the method including: controlling the operations of one or more engines during a mission, which includes a takeoff phase, a climb phase, and a cruise phase, where the climb phase includes a top of climb (ToC) period prior to transitioning to the cruise phase; controlling the one or more engines to output a takeoff thrust during the takeoff phase, where the takeoff thrust corresponds to a maximum thrust during the takeoff phase; controlling the one or more engines to output a ToC thrust during the ToC period, where the ToC thrust corresponds to an average thrust during the ToC period; and controlling the one or more engines to cause the aircraft to cruise at 0.5 Mach or above; wherein the instructions control the one or more engines such that a thrust ratio is maintained between 1.1 to 1.6, the thrust ratio being defined as a ratio of the ToC thrust normalized by a ToC ambient static pressure to the takeoff thrust normalized by a takeoff ambient static pressure.

A computer-readable storage medium having stored thereon instructions that, when executed by a processor, cause the processor to perform a method for controlling the operation of engines in an aircraft, the method including: controlling operations of one or more engines of the aircraft during a mission including a takeoff phase, a climb phase, and a cruise phase, the climb phase including a top of climb (ToC) period prior to transitioning to the cruise phase; controlling the one or more engines to output a takeoff thrust during the takeoff phase, the takeoff thrust corresponding to a maximum thrust during the takeoff phase; and controlling the one or more engines to output a ToC thrust during the ToC period, the ToC thrust corresponding to an average thrust during the ToC period, and the ToC period ends at an altitude above 28,000 ft.; wherein the one or more engines is controlled such that a thrust ratio is between 1.1 to 1.6, the thrust ratio being defined as a ratio of the ToC thrust as normalized by a ToC ambient static pressure to the takeoff thrust as normalized by a takeoff ambient static pressure.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating engines of an aircraft, the method comprising:

controlling operations of one or more engines of the aircraft during a mission including a takeoff phase, a climb phase, and a cruise phase, the climb phase including a top of climb (ToC) period prior to transitioning to the cruise phase;

controlling the one or more engines to output a takeoff thrust during the takeoff phase, the takeoff thrust corresponding to a maximum thrust during the takeoff phase;

controlling the one or more engines to output a ToC thrust during the ToC period, the ToC thrust corresponding to an average thrust during the ToC period; and controlling the one or more engines to cause the aircraft to cruise at 0.5 Mach or above;

wherein the one or more engines are controlled such that a thrust ratio is between 1.1 to 1.6, the thrust ratio being defined as a ratio of the ToC thrust as normalized by a ToC ambient static pressure to the takeoff thrust as normalized by a takeoff ambient static pressure.

2. The method of claim 1, wherein the one or more engines comprise an open rotor engine including a rotor and stator vanes aft of the rotor.

3. The method of claim 1, wherein the one or more engines comprise an open rotor engine including counter-rotating rotors.

4. The method of claim 1, wherein the one or more engines comprise an engine with an annular core inlet.

5. The method of claim 1, wherein the aircraft comprise two or more engines.

6. The method of claim 1, wherein the ToC period ends at an altitude above 28,000 ft.

7. The method of claim 1, wherein the ToC period comprises a last two minutes of the climb phase.

8. The method of claim 1, wherein the ToC period occurs in an altitude range within two thousand feet below cruise altitude of the cruise phase.

9. The method of claim 1, wherein the one or more engines are coupled to wings of the aircraft dimensioned to have a wing aspect ratio greater than 10, the wing aspect ratio of a wing being the ratio of a square of a wingspan to a projected wing area.

10. The method of claim 1, wherein the one or more engines includes a ducted engine.

11. The method of claim 1, wherein each of wing of the aircraft includes folding wing tips.

12. The method of claim 1, wherein a truss is coupled between each wing of the aircraft and a fuselage.

13. The method of claim 1, wherein the engines are coupled to a fuselage dimensioned to hold 270 or less passengers.

14. The method of claim 1, further comprising controlling thrust produced by each of the one or more engines to be less than 50,000 lbs.

15. The method of claim 1, wherein each of the one or more engines is configured to have a bypass ratio (BPR) of 15 to 100.

16. The method of claim 1, wherein each of the one or more engines are configured to have a fan pressure ratio (FPR) of 1.05 to 1.5.

17. A method of operating engines of an aircraft, the method comprising:

controlling operations of one or more engines of the aircraft during a mission including a takeoff phase, a climb phase, and a cruise phase, the climb phase including a top of climb (ToC) period prior to transitioning to the cruise phase, wherein the ToC period ends at an altitude above 28,000 ft;

controlling the one or more engines to output a takeoff thrust during the takeoff phase, the takeoff thrust corresponding to a maximum thrust during the takeoff phase; and controlling the one or more engines to output a ToC thrust during the ToC period, the ToC thrust corresponding to an average thrust during the ToC period;

wherein the one or more engines is controlled such that a thrust ratio is between 1.1 to 1.6, the thrust ratio being defined as a ratio of the ToC thrust as normalized by a ToC ambient static pressure to the takeoff thrust as normalized by a takeoff ambient static pressure.

18. The method of claim 17, wherein the aircraft comprises two or more engines.

19. The method of claim 17, wherein the ToC period occurs at an altitude range within two thousand feet below cruise altitude of the cruise phase.

20. A non-transitory computer-readable storage medium having stored thereon instructions that, when executed by a processor, cause the processor to perform a method for controlling operation of one or more engines in an aircraft, the method including:

controlling the operations of one or more engines during a mission, which includes a takeoff phase, a climb phase, and a cruise phase, where the climb phase includes a top of climb (ToC) period prior to transitioning to the cruise phase;

controlling the one or more engines to output a takeoff thrust during the takeoff phase, where the takeoff thrust corresponds to a maximum thrust during the takeoff phase;

controlling the one or more engines to output a ToC thrust during the ToC period, where the ToC thrust corresponds to an average thrust during the ToC period; and controlling the one or more engines to cause the aircraft to cruise at 0.5 Mach or above; wherein the instructions control the one or more engines such that a thrust ratio is maintained between 1.1 to 1.6, the thrust ratio being defined as a ratio of the ToC thrust normalized by a ToC ambient static pressure to the takeoff thrust normalized by a takeoff ambient static pressure.

21. The method of claim 17, wherein the one or more engines comprise an open rotor engine including counter-rotating rotors.

* * * * *